INVENTOR.
DAVID W. FOSS

Aug. 23, 1960 D. W. FOSS 2,949,790
TUNABLE CAVITY RESONATOR
Filed July 8, 1958 4 Sheets-Sheet 2

INVENTOR.
DAVID W. FOSS
BY
ATTORNEY

Aug. 23, 1960  D. W. FOSS  2,949,790
TUNABLE CAVITY RESONATOR
Filed July 8, 1958  4 Sheets-Sheet 3

INVENTOR.
DAVID W. FOSS
BY
ATTORNEY

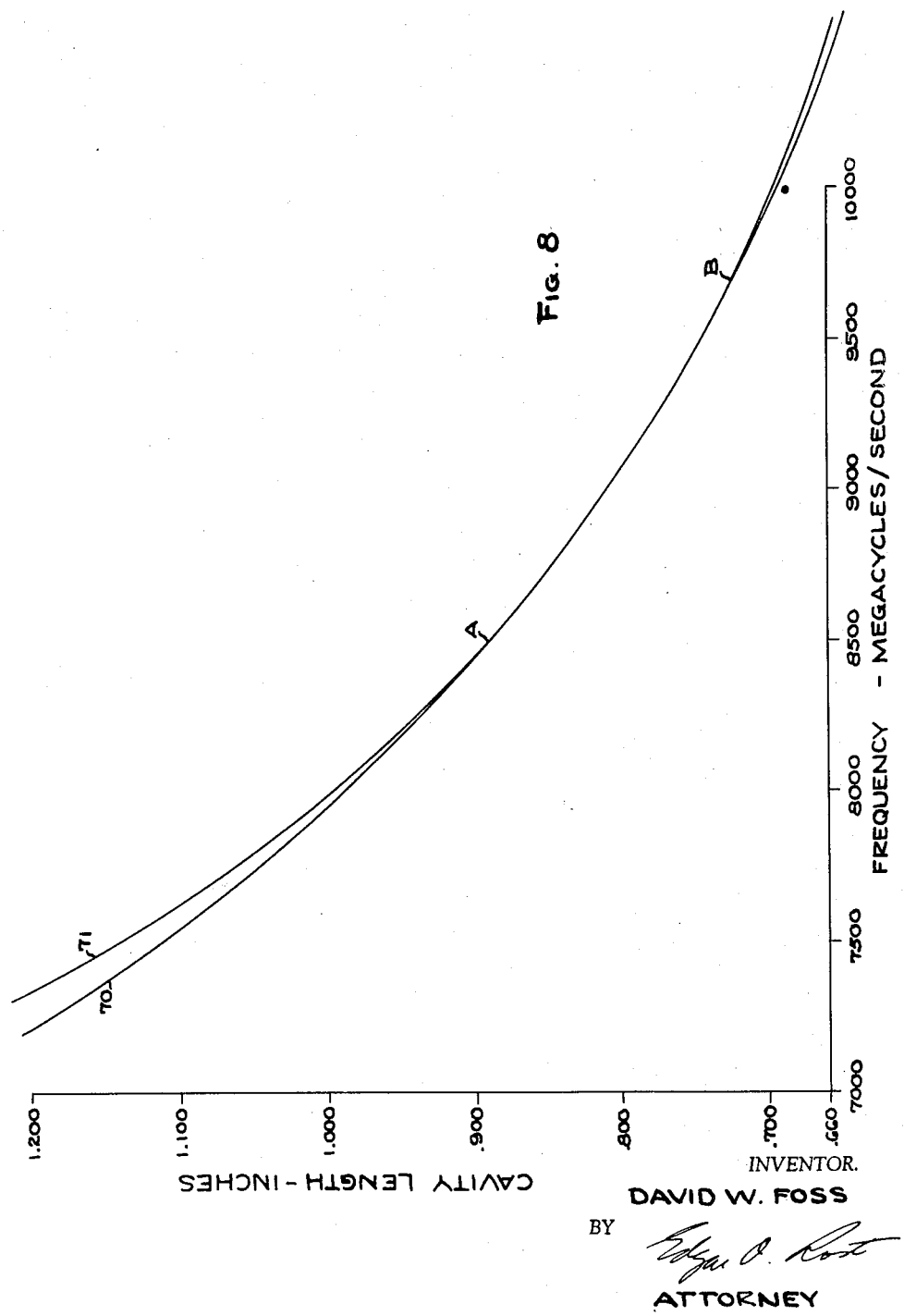

United States Patent Office 2,949,790
Patented Aug. 23, 1960

2,949,790

TUNABLE CAVITY RESONATOR

David W. Foss, Ipswich, Mass., assignor to Bomac Laboratories Inc., Beverly, Mass., a corporation of Massachusetts Filed July 8, 1958, Ser. No. 747,181

3 Claims. (Cl. 74—89)

The present invention relates to tunable cavity resonators and more particularly to a novel direct-reading frequency tuning mechanism for use in such resonators.

Numerous mechanical linkage systems are known in the art to adjust the positioning of a tuning plunger within a resonant cavity to vary the frequency. Generally micrometer type adjusting means are incorporated with a reading on the graduated dial requiring conversion from a calibrated chart to advise the user of the resonant frequency.

The present invention, however, has for its primary object the provision of a novel mechanical linkage system for tuning resonant cavities.

A further object is to provide a mechanical linkage system which permits direct-reading of frequency settings independent of any conversion from calibrated charts.

A still further object is to provide a mechanical linkage system for tracking the hyperbolic relationship of frequency and cavity length over a wide frequency range and directly record the resonant frequency at all times.

Other objects, features and advantages will be apparent after consideration of the following detailed specification and appended drawings, in which:

Fig. 8 is a chart plotting resonant frequency as a function of cavity length.

Figure 1:
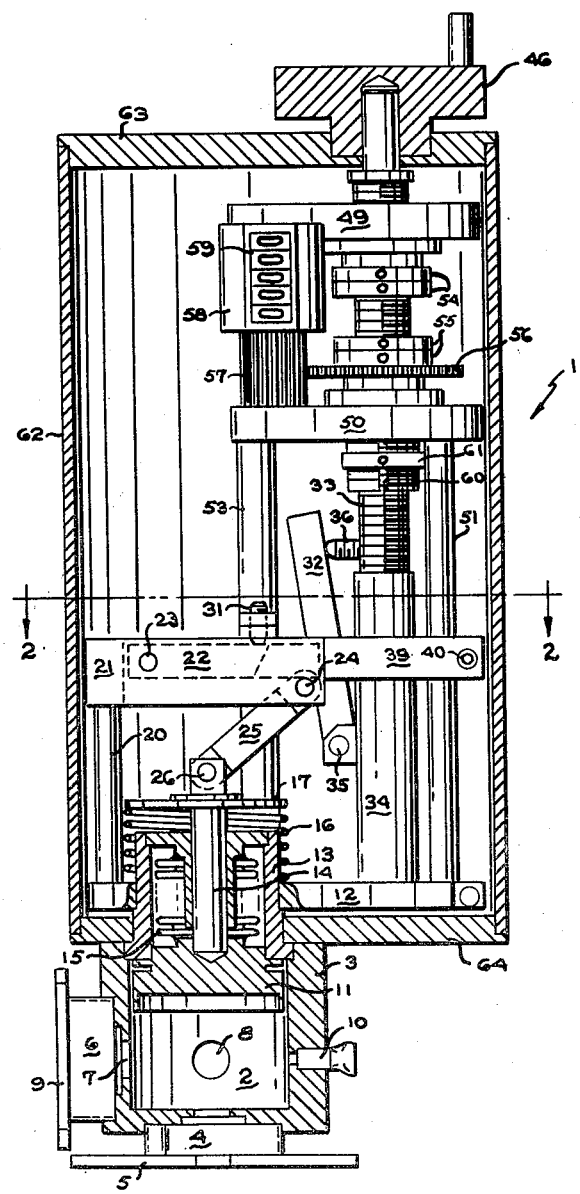
Fig. 1 illustrates the embodiment of the invention with the upper half shown in perspective and the lower half shown in cross section.

Referring to the drawings the illustrative embodiment 1 comprises a dual mode resonant cavity 2 defined by a metallic body member 3 having an input member 4 with suitable waveguide mounting flange 5. Two output members 6 are coupled through apertures 7 and 8 with one of the output waveguide mounting flanges being shown at 9. An exhaust tubulation 10 introduced into member 3 provides means for evacuating of the internal atmosphere and filling with any desirable inert atmosphere such as argon at a pressure slightly in excess of atmospheric. Changes in frequency resulting from varying humidity conditions are thereby eliminated as well as providing an upward force on the tuning mechanism to be described.

A tuning plunger 11 desirably of the choke type is axially disposed within member 3 to vary the cavity dimensions. The novel mechanical linkage system of the present invention is, therefore, associated with the plunger and extends coaxially therewith. This mechanical structure is supported by means of a bottom plate 12 encircling the housing member 13 within which the tuning plunger rod 14 and bellows 15 are disposed. A spring 16 limited by a backing member 17 secured to rod 14 provides for urging of said plunger upwardly.

Figure 6:
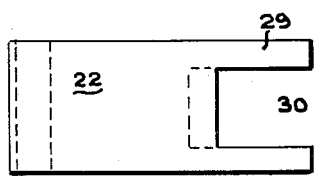
Fig. 6 is a plan view of the slide element of the invention.

The mechanical linkage system of the invention will now be described with reference to Figs. 2–5. Support member 21 is secured as by threaded bolts to a plurality of struts 20 spaced approximately 120° apart. Positioned within support member 21 is a horizontally disposed bearing member 22 secured in cantilever fashion by a pivot pin 23. The under surface of member 22 may be ground and polished to provide a bearing surface for a bearing pin 24 secured adjacent to one end of arm 25. The opposite end of arm 25 is coupled to the plunger rod 14 by means of pin 26. It will be noted in Fig. 5 that arm 25 is provided with a yoke 27 defining an opening 28 to permit access to bearing pin 24. Bearing member 22 is also shown in Fig. 6 as having a bifurcated end 29 over a portion of its length to facilitate movement of yoke 27 within the confines of an opening 30 defined at end 29. An adjustment screw 31 provides means for variation of angle $\alpha$ defined between the bearing member 22 and arm 25. In calculating a value for this angle the length of the arm 25 must be predetermined. The control of this angle will determine the axial movement of the tuning plunger over a selected range of resonant frequencies in the manner to be hereinafter described.

Figure 2:
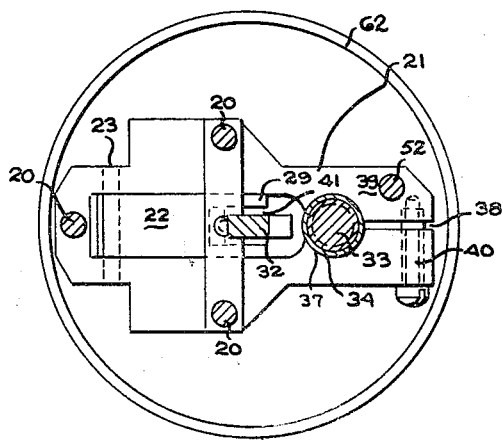
Fig. 2 is a plan view along the line 2—2 in Fig. 1.
Figure 4:
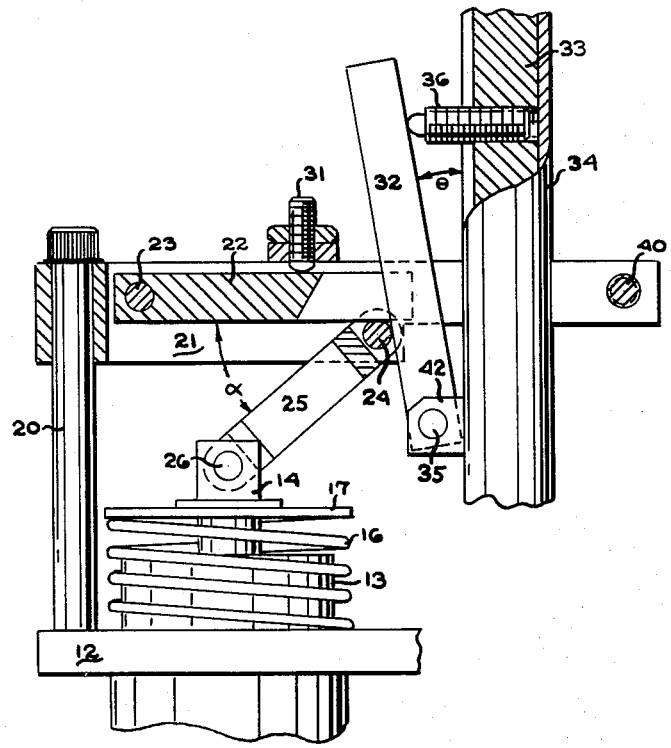
Fig. 4 is an enlarged perspective view of the principal components of the linkage system.
Figure 5:
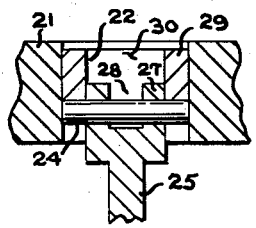
Fig. 5 is a cross sectional view illustrative of the relationship of the principal components of the system.

The linear motion of the bearing pin 24 along member 22 will be controlled by advance of a sine bar 32 having a fixed predetermined length and forming an angular extension to a tuner rod 33. Sine bar 32 engages bearing pin 24 within opening 28. Advancement of the sine bar 32 is facilitated by means of a tuner rod 33 slidably disposed within a tuner rod bearing 34. The sine bar 32 is securely connected to tuner rod 33 by means of sine pivot 35 with the angle $\theta$ adjusted by a sine screw 36. Referring to Fig. 2 the positioning of the sine bar mechanism within the support member will be evident.

Figure 3:
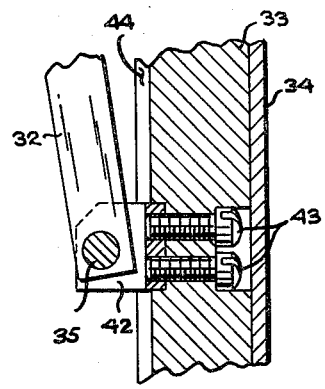
Fig. 3 is an enlarged view of a portion of the overall mechanical structure.

Support member 21 is provided with a passage 37 to accommodate the tuner rod bearing 34. A slit 38 separates the end 39 and a screw 40 provides for constriction of the passage walls to whereby rigidly secure the tuner rod bearing. Passage 41, therefore, is provided to accommodate the sine bar 32. Since the tuner rod bearing 34 is slotted throughout its length as at 44 the sine screw 36 as well as the attaching means for holding sine pivot 35 move axially as the tuner rod 33 is axially displaced. In Fig. 3 the attaching means for securing sine bar 32 are illustrated and comprise bracket 42 fastened by means of screws 43. The pivot 35 will thus be rigidly secured by the bracket.

Figure 7:
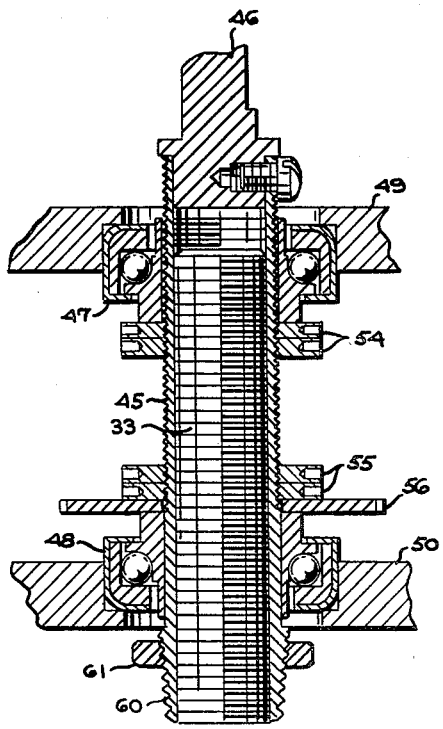
Fig. 7 is an enlarged view partly in cross section of the rotating components of the system.

The vertical displacement of the tuner rod 33 results in the linear or horizontal displacement of bearing pin 24 to thereby urge arm 25 downwardly and in turn produce displacement of the tuning plunger 11. The direct-reading frequency feature of the embodiment of the invention will now be described reference being had to Fig. 7 in addition to Fig. 1. Tuning rod 33 is threaded over a major portion of its length and threadably engages drive screw 45. The drive screw is retained from axial as well as lateral movement upon rotation of knob 46 by means of radial thrust bearings 47 and 48 which are supported within plates 49 and 50. Plate 50 is positioned by an elongated strut 51 extending through aperture 52 in support 21 and two additional struts 53, one of which is visible. Positive engagement of drive screw 45 with thrust bearing 47 is assured by usage of threaded lock nuts 54. In addition lock nuts 55 bear positively against large gear 56 which is in turn in engagement with thrust bearing 48. The gear 56 meshes with a smaller gear 57 which in turn actuates counter 58. Hence rotation of drive screw 45 results in a direct reading of the frequency as shown on dial 59 of counter 58 and simultaneous vertical movement of the tuner rod 33. The drive screw 45 is provided with a tapered and slotted conventional plumbing connection 60 to facilitate adjustment of the closeness of the fit between the threads on tuner rod 33 and drive screw 45. As lock nut 61 is tightened upon connection 60 the degree of fit will be increased.

The entire mechanical linkage system is enclosed in a protective housing 62 which may consist of a cylindrical member closed at one end 63 and secured to the upper wall of member 3 by means of a base plate 64. Having thus described the mechanical details of the embodiment the method of operation will now be described.

As knob 46 is rotated the drive screw 45 will be similarly rotated. By reason of the fixed position of the drive screw as far as lateral or axial displacement, the tuner rod 33 will be displaced axially by this rotating movement. Further, gear 56 will rotate directly with gear 57 to operate the spindle of counter 58 and thereby record the resonant frequency. With the displacement of the tuner rod 33, sine bar 32 having the angle $\theta$ determined by its length and desired horizontal distance of travel, bears against bearing pin 24 to move same in a horizontal direction. The combination of these movements produces through the linkage system a variation in the position of the tuning plunger 11 within member 3 to alter the resonant cavity 2 dimensions. A plot of resonant frequency against the cavity length is shown in Fig. 8 as curve 70 and assumes the configuration of a hyperbola. The mechanical system of the invention will provide a horizontal motion of the bearing pin 24 which produces movement of the arm 25 to displace plunger 11. A plot of the resultant motion with the disclosed mechanical system is shown in curve 71. It will be noted that between points A and B the illustrative mechanism tracks the theoretical computations. The angle $\alpha$ was determined empirically to be approximately 39.5° at the low or 8500 megacycle end of the band and 52° at the 9600 megacycle frequency when the length of arm 25 was approximately one inch. The angle $\theta$ which remains constant was determined to be approximately 8° for a sine bar having a length of approximately one and three quarters inches. By means of screws 31 and 36 the angular displacement may be adjusted to provide the desired tracking of the resonant frequency with the counter reading.

In the mechanical considerations of a model of the invention a tuner rod 33 travel of 1.100 inches was selected to result in a .0010 inch change for each megacycle over a frequency range of 8500 to 9600 megacycles. A drive screw 45 having a 40 t.p.i. thread will advance the tuner rod .025 inch with each complete revolution to result in a 25 megacycle change. Since conventional counters may read ten units for each revolution, gears 56 and 57 may be geared to have corresponding ratio of 2.5:1. By loosening lock nuts 55 gear 56 may be independently rotated so as to allow the counter dial 59 to correspond to the cavity frequency and then the nuts 55 may be tightened. Hence the user will be able to read directly the resonant frequency at all times without referring to micrometer dial settings and calibration charts. Further, with the illustrative embodiment, selection of metals having a low coefficient of expansion will result in frequency variation of .7 megacycle or less over a temperature range of 100° C. The metal referred to be the trade name "Invar" is an example of such a desirable material.

The invention as described herein will thus provide an accurate and reliable device for the determination of microwave frequencies. It will be useful as a component in many radar systems, as well as a precision measurement device for use in development and manufacturing programs. With the adjustment features disclosed in the illustrative embodiment it will be possible to fabricate individual components without holding extremely critical tolerances, particularly in the screw threads and rotatable members. Prior art device employing direct screw controlled mechanisms without the sine bar arrangement will reflect axial looseness or thread defects directly in the frequency accuracy. My arrangement assures a higher degree of accuracy and minimizes the effect of any such mechanical defects.

What is claimed is:

1. A mechanical linkage system for actuating a tuning plunger axially disposed within a metallic body member defining a resonant cavity, said mechanical linkage system comprising a rotatable drive screw mounted by means preventing axial and lateral movement thereof, a tuner rod threadably engaging said drive screw, said rod being axially displaced upon rotation of the drive screw, a bar member connected to said rod to define an angular extension, a bearing member positioned generally normal to the direction of travel of the tuning rod, an arm having a bearing pin disposed adjacent to one end with the opposite end pivotally connected to the tuning plunger, the underside of said bearing member being in engagement with said bearing pin, said bar member contacting said bearing pin thereby to displace the same along said underside as said rod is axially displaced, the total distance of travel of said pin being determined by the angular displacement and length of said bar member, the total distance of axial movement of the tuning plunger being determined by the angular displacement between said bearing member and arm as well as the distance of travel of said pin along the underside of said bearing member and means for adjustment of both angular displacements to a predetermined value determined by the desired axial displacement of the tuning plunger.

2. A mechanical linkage system according to claim 1 wherein said bearing member is bifurcated at one end to receive an end of said arm and said bar member.

3. A mechanical linkage system according to claim 1 wherein said bar member is of a fixed predetermined length.

References Cited in the file of this patent

UNITED STATES PATENTS

| | | |
|---|---|---|
| 966,046 | Noonan | Aug. 2, 1910 |
| 2,467,020 | Fischer | Apr. 12, 1949 |
| 2,481,129 | Le Tourneau | Sept. 6, 1949 |
| 2,618,167 | Seifert | Nov. 18, 1952 |
| 2,666,904 | Johnson | Jan. 19, 1954 |
| 2,752,576 | Hilliard | June 26, 1956 |
| 2,834,216 | Thompson | May 13, 1958 |